United States Patent [19]

Fujita

[11] 4,142,135

[45] Feb. 27, 1979

[54] FORK LIFT TRUCK WITH BALANCE WEIGHT USING BATTERIES AS POWER SOURCE

[75] Inventor: Kazuya Fujita, Tokyo, Japan

[73] Assignee: Shinko Electric Co., Ltd., Tokyo, Japan

[21] Appl. No.: 792,467

[22] Filed: Apr. 29, 1977

[51] Int. Cl.$^2$ ............................................. H02P 5/00
[52] U.S. Cl. .................................... 318/139; 318/340; 318/358; 318/359; 318/376; 318/409; 318/428; 318/497; 318/269; 318/533
[58] Field of Search ............... 318/139, 340, 350, 357, 318/358, 359, 376, 377, 378, 409, 428, 533, 497, 269

[56] References Cited

U.S. PATENT DOCUMENTS

| | | | |
|---|---|---|---|
| 1,954,770 | 4/1934 | Prantl | 318/376 |
| 2,911,053 | 11/1959 | Ayerrs et al. | 318/359 |
| 3,716,768 | 2/1973 | Mason | 318/139 |
| 3,923,116 | 12/1975 | Thompson et al. | 318/139 |
| 3,938,013 | 2/1976 | Seilly et al. | 318/497 |
| 3,987,349 | 10/1976 | Shibata et al. | 318/139 |

Primary Examiner—Robert K. Schaefer
Assistant Examiner—Eugene S. Indyk
Attorney, Agent, or Firm—James E. Nilles

[57] ABSTRACT

A speed control device for use in a battery-powered vehicle wherein a shunt field current in a compound electric motor for driving the vehicle having a reactor connected in series therewith can be selectively controlled by using a variable resistor included in the circuitry and operatively interconnected to an accelerator pedal so that the resistance to the shunt field current may be changed accordingly to the extent of stepping-down on the pedal by the operator. The speed control device also features that a part of the vehicle's body structure of a ferro-magnetic material is used in combination as a core of the reactor so as to form a complete magnetic circuit for the reactor.

10 Claims, 12 Drawing Figures

FORK LIFT TRUCK WITH BALANCE WEIGHT USING BATTERIES AS POWER SOURCE

BACKGROUND OF THE INVENTION

The present invention relates in general to a controlling device for use in a battery-powered vehicle, and more particularly to a speed control device for use in a battery-powered vehicle adapted to control a shunt field current in a compound electric motor thereby to obtain the speed control of a battery-powered vehicle.

In a general battery-powered vehicle application, unlike an ordinary electricity-powered vehicle which is continuously supplied with electricity from an external source of power, it is inevitable that there is practically a substantial restriction in a vehicle's capability such as a distance or a payload that the vehicle can cover with a single charge of its battery. In consideration of this fact, it is essential in the design of such a vehicle to obtain an as high as possible operating efficiency so as to have a maximum extent of its capability in terms of a running distance or a payload. In recent years, there was developed the direct current chopper system, and the operating efficiency of such a battery-powered vehicle has been improved substantially with the introduction of such direct current chopper system to the battery-powered vehicle, instead of the conventional speed control system incorporating the series-connected resistance and switches. However, with the application of the direct current chopper system, because of an increase in the iron (core) loss produced from the chopping of a voltage applied, the ohmic loss due to a great chopping current, etc. in comparison with a speed control system applying the shunt field control, a battery-powered vehicle having such direct current chopper system is still suffering from relatively low efficiencies in the starting and power running conditions. In this consideration, in the case of a battery-powered folk lift truck in which frequent starting and stopping operations are involved in the field duties or in the case of a battery-powered locomotive in which uphill and downhill operations are frequently encountered, it is actually an indispensable technique to put the vehicles in the regenerative braking condition so as to convert the kinetic energy of the train into the electric energy for improving the overall operating efficiency of the vehicles. However, in the practical design and construction of such the power regenerating installation of such direct current chopper systems, which have been practiced in the ordinary external-power-sourced electric trains, the circuitry and devices incorporated therein inevitably become complicated, thus resulting in a more initial cost and maintenance expenses, which has not been practiced particularly in the application to the fork lift trucks in which frequent starting and stopping operations are essential in their routines.

In addition, in the case of the chopper system, when a voltage in the armature of an electric motor becomes higher than that of a power source, a current in the armature is caused to overflow in the windings thereof, thus leading to an uncontrollable state, and consequently, there is such a defect that it is practically impossible to obtain a sufficient efficiency in the regenerative braking operation for the reason that in a high revolutionary range of the armature where a maximum energy can be regenerated, the current passing through the armature must necessarily be limited to a relatively low level.

In consideration of such drawbacks of the conventional art as mentioned above, it would be advantageous if an alternative may be realized to overcome such drawbacks. The present invention is essentially directed to meet such requirements, in which there is provided a unique circuitry having a reactor connected in series with a compound motor, which can be adapted to control the shunt field, thereby to obtain a speed control of the electric motor or a vehicle.

Incidentally, like the regenerating reactor included in the conventional system of the chopper type, in the practice of a speed control by way of the shunt field control according to this invention, a reactor for the purpose of preventing a sharp current rise in the starting or an irregular surge in the armature is needed as mentioned above. This reactor is an essential component of this invention for achieving a simple-construction yet high-efficiency regenerative brake system. In a series of experiments, when a 5 KWH electric motor is applied to the driving of a fork lift truck having a light weight of 3 to 4 tons, it is sufficient to use a reactor having a specific conductance of 20 milli henries or so. However, from the actual design and constructional viewpoint, the space, weight and cost of such a reactor would be a substantial obstacle in the production of a vehicle. In consideration of this fact, this invention is intended to overcome such obstacles as mentioned above.

SUMMARY OF THE INVENTION

It is therefore a primary object of the present invention to provide an improved speed control device for use in a battery-powered vehicle wherein there are incorporated a compound motor for driving a vehicle, a reactor connected in circuit between the compound motor and a power source or a battery and adapted to versatilely prevent a sharp current rise in the start or an irregular surge in the control circuitry during the operation, and an accelerator control mechanism adapted to operate according to the extent of stepping-down on the accelerator pedal by the operator.

It is another object of this invention to provide an improved speed control device for use in a battery-powered vehicle wherein there is applied a part of the vehicle's structure of a ferromagnetic material as a magnetic path or circuit for the reactor for preventing a sharp current rise in the starting or an irregular surge in the control circuitry.

According to this invention, briefly summarized by way of a preferred embodiment thereof, there is provided an improved speed control device for use in a battery-powered vehicle which comprises in combination a compound motor for driving the vehicle, power source means for the compound motor, reactor means coupled in circuit between the power source means and the motor and adapted to prevent a sharp current rise, and means for controlling a shunt field current of the motor armature according to an extent of stepping-down on an accelerator pedal of the vehicle by the operator.

The foregoing objects, characteristics, principle, and details of the present invention, as well as further objects and advantages thereof, will become apparent from the following detailed description with respect to preferred embodiments of the invention when read in conjunction with the accompanying drawings, in which like parts are designated with like reference numerals.

BRIEF DESCRIPTION OF THE DRAWING

In the drawings;

FIGS. 1A and 1B are schematic wiring diagrams showing the conventional air chopper system, in which FIG. 1A shows a state of power running, and FIG. 1B shows a state of power regeneration;

DETAILED DESCRIPTION OF THE PREFERRED EMBODIMENT

The construction and operation of an improved speed control device for use in a battery-powered vehicle according to this invention will now be described in detail with respect to preferred embodiments thereof in conjuction with the accompanying drawings. It should be understood, however, that the embodiments appeared herein are for illustrative purpose only, but not in any way for limitations of the scope and spirit of the invention.

Figure 1A:
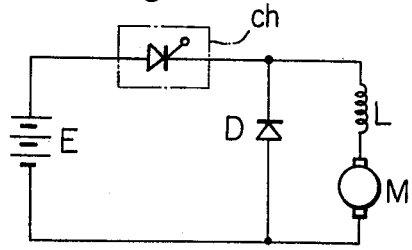
Figure 1B:
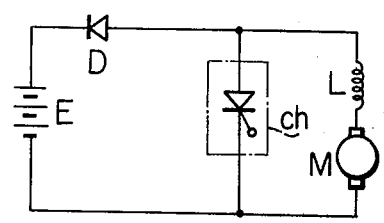

FIGS. 1A and 1B are schematic wiring diagrams which are designed to simply show the states of power running and power regeneration, respectively, in the conventional art chopper system. In FIG. 1A, there is shown a diode D which is connected in circuit from the positive electrode of a power source or battery E, through a chopper Ch connected in series, and through a series field coil L connected in parallel, and an armature M of the electric motor, and to the negative electrode of the battery E. In FIG. 1B, there is shown a case wherein the diode D and the chopper Ch are replaced with each other in connection in comparison with the connection shown in FIG. 1A. As shown in these figures, when the system including a single chopper therein is used and the vehicle is shifted from its power running condition to a power regeneration state, the chopper section Ch should be shifted from a series connection to a parallel one with the electric motor, while the flywheel diode D should be shifted from a parallel connection to a series connection with the motor. Particularly, in the case of a fork lift truck, since it is generally required to brake the vehicle at such a high frequency as several times for 1 minute during the operation, essential is a device assured with features such that a quick shifting between series and parallel connections can be readily made and with a high stability in the power regenerative braking operation. In this consideration, there have been proposed certain approaches for reducing the number of the switches in the system circuit which are required for shifting the connection of the circuit during the operation, but such circuits are likely to result in such drawbacks as complexity in construction and increase in cost. In the case of a battery-powered locomotive which is to be applied to the operation requiring less chances of power regeneration braking and with the conventional chopper system, when applied with a power regeneration braking during the operation, there are plenty of complicated and difficult problems, e.g., positive building-up of a regenerated voltage, prevention of overcurrent in the circuitry, decision of an optimal chopping frequency, selection of circuit components or elements including a reactor, etc., in order to obtain a stable power regeneration braking operation within a specified range of speeds of the vehicle.

Figure 2:
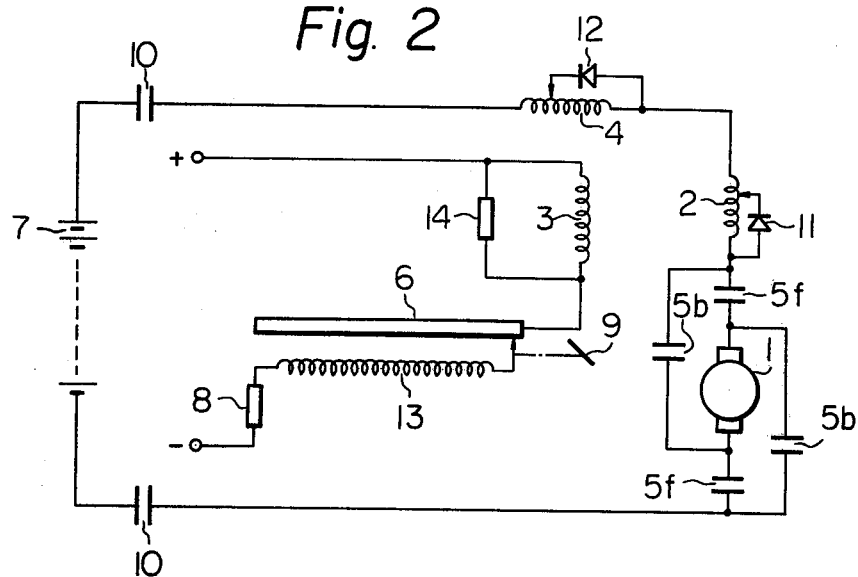
FIG. 2 is a schematic diagram showing a basic construction of a vehicle speed control device circuit according to this invention.

Referring now to FIG. 2, there is shown a basic circuit embodying the present invention, wherein there are provided a power source of battery 7, a direct current compound motor including an armature 1, a series field windings 2 and a shunt field windings 3, a reactor 4 connected in series between the battery 7 and the series field windings 2, a forward drive contactor 5f connected in series with the armature 1, and a rearward drive contactor 5b connected in parallel with the armature 1. One terminal of the shunt field windings 3 of the motor is connected in circuit with a variable resistor 6 for regulating a shunt field current. Also, there is connected operatively an accelerator pedal 9 to the movable part of the variable resistor 6 in such a manner that a resistance value of the variable resistor 6 is changeable in proportion to the extent of stepping-down on the pedal by the operator of a vehicle. The switch 10 can be turned to be "on" with the stepping-down on the pedal 9 by the operator. A diode 11 is adapted to short-circuit all or part of the series field windings 2 during a power regeneration braking operation, while a diode 12 is adapted, during a power regeneration braking, to short-circuit all or part of the reactor windings for the starting and for preventing an irregular surge in the circuit. The other terminal of the shunt field windings 3 is connected to a positive terminal, a discharge resistor 14 is connected in parallel with the shunt field windings 3. On the other hand, a movable extension of wire 13 and a fixed resistance 8 for the shunt field circuit are connected in series circuit, and the other terminal of the above mentioned movable wire is connected with the variable resistor 6, and the other terminal of the resistance 8 with a negative terminal in the circuit.

Figure 3:
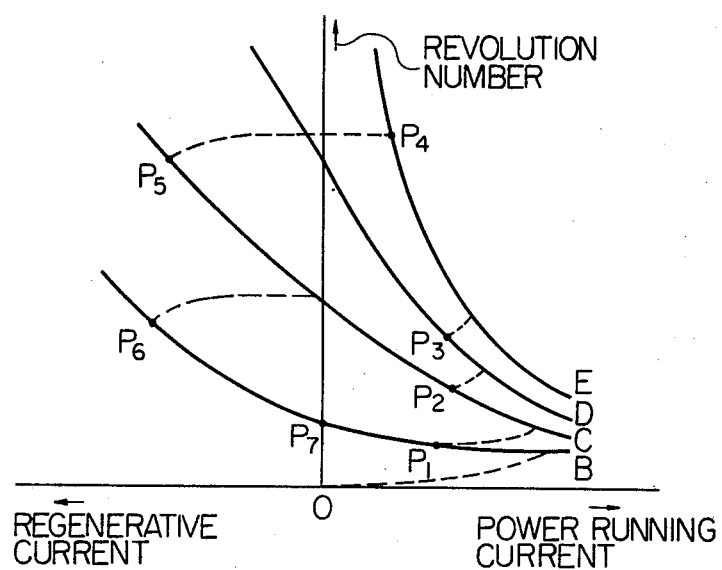
FIG. 3 is a graphic representation showing a characteristic curve in terms of the armature current versus the armature revolution number of the armature shown in FIG. 2.

FIG. 3 is an exemplary graphic representation showing the characteristic curves of the speed control device having the construction as fully described above, with an armature current plotted on the abscissa and a revolution number on the ordinate. With the construction of the operating circuit, the contactor 5f is put "on" when the vehicle is moved in the forward direction, while the contactor 5b is put "on" when the vehicle is driving in the rearward direction, thereafter stepping-down on the accelerator pedal 9 to a slight extent, firstly the shunt field current will reach a maximum level, then a further stepping-on of the pedal will put the main circuit switch 10 to be "on," thus causing the electric motor to be operated. As the starting current is limited to an appropriate level by function of the reactor 4 in the circuit, there is effectively prevented such improper operating state as a flashover, etc., of the motor, thus resulting in a smooth starting or the vehicle. As the armature current decreases gradually along the curve B in FIG. 3, the vehicle's speed will gain increasingly. When the accelerator pedal 9 is stepped-down on further by the operator at the point P1 so as to have the shunt field current decreased and select the motor characteristic aspect on the curve C, the armature current will sharply become greater from the point P1 on the curve B toward the curve C. As the vehicle speed increases along the curve C, the armature current will gradually decrease accordingly. When the accelerator pedal is stepped down again at the point P2 by the operator, the motor characteristic aspect is now shifted over to the curve D, and the armature current is increased likewise sharply. As the vehicle speed increases along the curve D, the armature is now decreasing along the curve D. Likewise, when stepping-on again the accelerator pedal 9 at the point P3 so as to shift over to the motor characteristic aspect on the curve E, the vehicle speed increases up to the point P4 on the curve E where a payload torque is met, thus the vehicle being operated continuously.

On the other hand, when the operator desires to drop the vehicle speed, and returns the accelerator pedal 9 down to the motor characteristic aspect represented by the curve C, the operating condition of the vehicle is now shifted over from the Point P4 to Point P5 on the curve C, i.e., a power regenerative braking state. In this operating condition, the armature current now flows reversely from the motor battery 7 so that the battery is now charged, and at the same time the vehicle is effected with a braking force, thus the vehicle speed reducing along the curve C and so is the regenerated current. When the accelerator pedal 9 is returned to a point where the motor characteristic aspect lies on the curve B, the regenerated current is further increased toward the level or point of P6 on the curve B, thus producing a braking force effected on the electric motor so as to cause the vehicle to be reduced in its speed along the curve B, and as the vehicle speed slows down the regenerated current decreased down to the point P7. This is all the steps of control for a battery-powered vehicle equipped with the speed control device according to the present invention.

As fully described hereinbefore, in the speed control device according to this invention, when in a power regeneration operation, the electric current passing through the series field windings 2 flows in the reverse direction and the polarity of the series field is now opposite to that of the shunt field, thus causing the shunt field to be deenergized, which would be a cause to a low efficiency of power regeneration. In order to meet such problem, there is provided the diode 11 in the circuitry in such a manner that all or part of the series field windings 2 may be short-circuited when in a power regenerating operation. Also, in order to effect a high efficiency of power regeneration, all or part of the windings of the reactor 4 for the starting compensation and for the prevention of an irregular surge during the operation is short-circuited when in a power regeneration operation. Although it is desirable to have all of the series field windings 2 and the reactor 4 short-circuited in view of a high efficiency power regeneration, a pair of these windings may, as a compromise, be left to be not-short-circuited from the viewpoint of the stability in operation. By virtue of this design concept, no matter how sharply the accelerator pedal 9 may be stepped-down by the operator regardless of the motor's state of operation, either in a power running or in a power regeneration, the reactor 4 connected in series with the motor will effectively and automatically prevent a sharp change of the electric current in the circuitry. In this consideration, in comparison with the conventional chopper system, the speed control device according to this invention is more advantageous in view of the efficiency in a power running operation, as well as the power regeneration efficiency during the retardation, and particularly at a high revolutional number of the armature, there is assured a stable power regeneration irrespective of any voltage generated in the motor armature, therefore, resulting in a substantial improvement in the power regeneration efficiency of the device.

Figure 4:
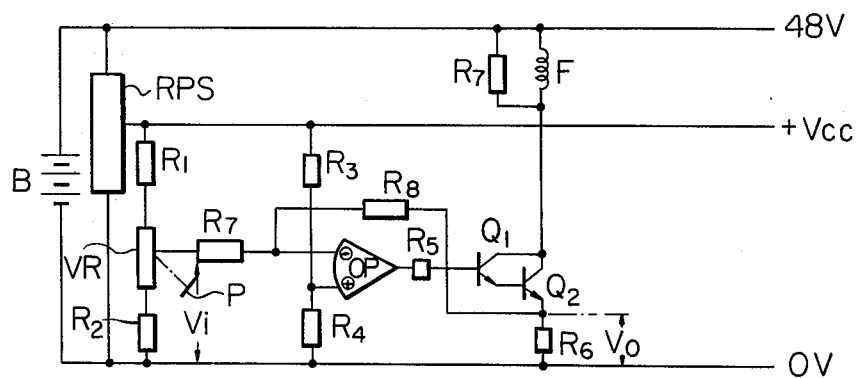
FIG. 4 is a schematic diagram showing a first example of the invention incorporating as an electric circuit the shunt field control section shown in FIG. 2.

In FIG. 4, there is shown an embodiment of this invention wherein there is provided an electric circuit of the shunt field control section shown in FIG. 2. In this circuitry, there is a constant-voltage device RPS connected in parallel with an operating power source B, the constant-voltage device RPS being connected further to a power source + Vcc. Series-connected resistor R1, variable resistor VR and resistor R2 are connected between the power source + Vcc and a terminal Ov of the power source B, series-connected resistors R3 and R4 being likewise connected between the power source + Vcc and the terminal Ov. A parallel-connected circuit comprising a resistor R7 and a shunt field winding F, and a Darlington connection comprising power transistors Q1 and Q2, and a resistor R6 are connected in series between the terminal 48V and Ov. The output of an operational amplifier OP is connected through a resistor R5 to the base of the transistor Q1, the plus terminal of the above mentioned operational amplifier OP being connected between the resistors R3 and R4, the minus terminal of that amplifier being connected through a resistor R8 to the emitter of the transistor Q2 and further contacting through a resistor R9 with the variable resistor. The accelerator pedal P is designed to change a resistance value of the variable resistor VR in proportion to an extent of stepping-down on the pedal by the operator in such a manner that a voltage Vi across the resistor R2 and a part of the variable resistor VR may be increased when stepped down on the pedal P. For instance, if the plus terminal of the operational amplifier OP is fixed at 3 volts by selecting the resistors R3 and R4, and the resistors R1 and R2 are selected so that the voltage Vi may become 6 volts at a maximum speed, while it may be 3 volts at a minimum speed when the pedal P stepped down by the operator, and if the resistors R5 and R8 are selected to be equal in their resistance value, the minus terminal of the operational amplifier OP may be controlled at 3 volts, and as the voltage drop (Vi − 3) due to the resistor R5 and the one (3 − Vo) due to the resistor R8 become equal, thus establishing a control, Vi + Vo = 6 volts. Consequently, if the voltage Vi is 3 volts, for instance, the voltage Vo is 3 volts, thus allowing a maximum field current of approximately 3/R6 amperes in the shunt field windings F, and if the voltage Vi is 6 volts, the voltage Vo turns out to be zero volt, allowing a minimum field current of zero ampere, thus attaining a vehicle speed control by function of the accelerator pedal P.

Figure 5:
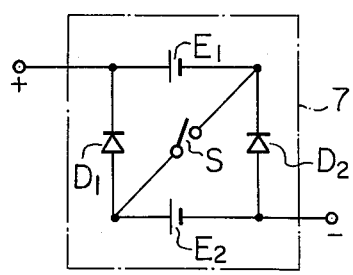
FIG. 5 is a wiring diagram showing a circuit for the power source incorporated which can be shifted for either series or parallel connection.

FIG. 5 is a wiring diagram showing a preferred embodiment of a battery circuit wherein there are provided two battery cells E1 and E2 divided from the battery 7 shown in FIG. 2, and having the same voltage and capacity, and these battery cells may be connected switchably in either series or parallel connection so as that the armature voltage can be changed selectively. The battery cells E1 and E2 are connected in parallel with each other, and the diodes D1 and D2 are connected in such a manner that the cathodes of these two diodes may be operatively connected between the both electrodes of the cell E1. There are provided a series-parallel shifting switch S between the cathode of the above mentioned diode D2 and the anode of the diode D1, which switch is adapted to function in such a manner that when it is closed, there is a series connection, and when it is open, there is a parallel connection between the two battery cells E1 and E2.

The foregoing embodiment shows an example of two-way switching connection between two battery cells. If and when it is desired to provide for a multiple stage switching more than two stages, there may be provided such an arrangement that considering the whole connection 7 as shown in FIG. 5 as a single unit of battery such as E1 or E2 as in the embodiment of FIG. 5, if there are provided two sets of such unit cells to be connected in the same manner as in the case of FIG. 5, it is possible to provide for a three-stage switching arrangement. Likewise, if there are added such connection of a desired number in the same manner, it is practicable to provide for a multistage switching arrangement accordingly. With the practice of such switching arrangement, it is possible to obtain a constantly stable and well-balanced discharge and charge among each unit battery cells.

Figure 6:
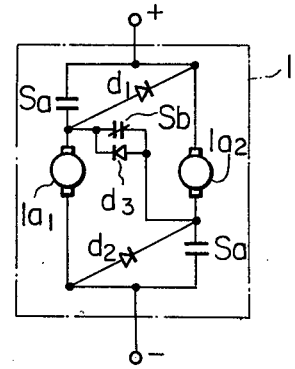
FIG. 6 is a schematic diagram showing an embodiment of the invention wherein the motor armature windings are divided into two sectios of windings so that it may be operated in either series or parallel operation.

FIG. 6 shows an example of a circuit wherein the motor armature is divided into two sections so that they may be switched in either series or parallel connection. In this arrangement, the two armatures 1a1, 1a2 are connected in parallel with each other, and there are provided contactors Sa on the plus side of the armature 1a 1 and on the minus side of the armature 1a2, the diodes d1 and d2 being connected in parallel with the above mentioned contactors Sa, respectively, and further there are a diode d3 and a contactor Sb connected in parallel between the plus side of the armature 1a1 and the minus side of the armature 1a2. These contactors Sb, Sa function in the opposite manner such that then the contactor Sa is open, the contactor Sb is closed, while the contactor Sa is closed, the contactor Sb is open. In the case that the contactor Sa is open and the contactor Sb is closed, the armatures 1a1 and 1a2 are put in a series connection, while the contactor Sa is closed and the contactor Sb is open, the armatures 1a1 and 1a2 are now put in a parallel connection. In the exemplary arrangement shown in FIG. 6, there is shown the case where the motor armature is divided into two sections. However, it is practicably possible to provide for a more-than-two division of the armature for a further multistage switching purpose.

It is to be understood that there are advantageously provided a greater range of speed control by incorporating in combination the series-parallel switching arrangements as shown in conjunction with FIGS. 5 and 6 in the vehicle speed control circuitry shown in FIG. 1. In the case that the vehicle speed is controlled by applying a series-parallel switching in the battery cells and the divided armatures with such arrangement as mentioned hereinbefore, there is an apprehension that there might occur an over-current in the circuitry in either a power running condition or a power regeneration condition. In fact, however, it may be readily understood by those skilled in the art that there is the reactor 4 connected in series with the circuitry, which reactor is selected with a capacity sufficient to effectively prevent any sharp current rise from occurring in any operating conditions and effect a smooth starting so that there is made available a smooth speed change of a vehicle.

Figure 7:
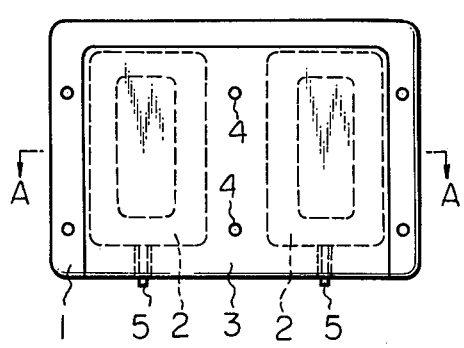
FIG. 7 is a front elevational view showing a embodiment of the invention wherein the balance weight of a fork lift truck is to be applied in a combined use as a reactor core.
Figure 8:
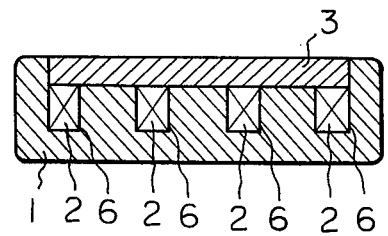
FIG. 8 is a cross sectional view taken along the plane designated by the line A—A in FIG. 7.
Figure 9:
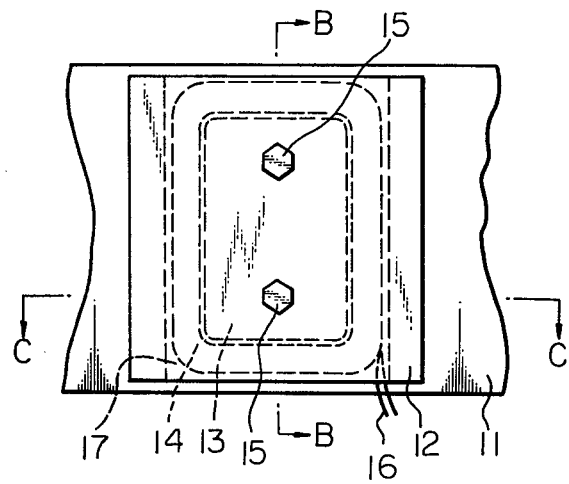
FIG. 9 is a front elevational view showing another embodiment wherein the thick steel sheet constructing a vehicle's body is to be applied in a combined use as a magnetic circuit of the reactor.
Figure 10:
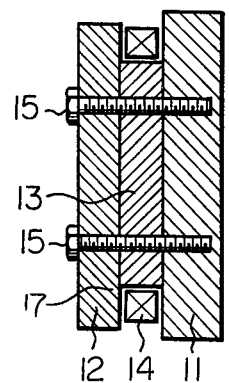
FIG. 10 is a cross sectional view taken along the plane designated by the line B—B in FIG. 9.
Figure 11:
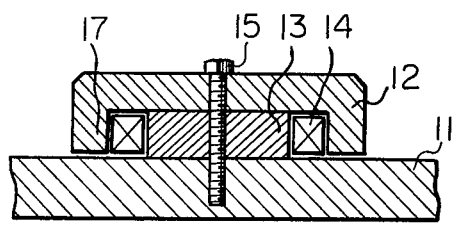
FIG. 11 is a cross sectional view taken along the plane designated by the line C—C in FIG. 9.

FIGS. 7 through 11 show exemplary embodiments of this invention wherein a part of the vehicle's body structure of a ferromagnetic material is applied in a combined use as a core of the reactor 4 for preventing an irregular current rise as shown in FIG. 2. In the drawing figures, FIG. 7 is a front elevational view showing the balance weight of a fork lift truck to be used as a core of the reactor, and FIG. 8 is a cross sectional view taken along the plane designated by the line A—A in FIG. 7. There are provided coils 2 in grooves 6 for accommodating the coils in the balance weight proper 1, and a coil holder plate 3 is fixedly mounted on the balance weight proper by using bolts 4, which coil holder plate is adapted to hold the coils in position of the grooves and form a magnetic path or circuit together with the balance weight proper 1. There are extended a plurality of lead wires 5 externally out of the coils. The grooves for accommodation of the coils may be formed in the process of production of the balance weight 1, when the balance weight is made of cast iron. FIG. 9 is a front elevational view showing another exemplary embodiment of this invention wherein a part of steel sheet of the vehicle's body is applied in a combined use so as to form a core of the reactor, FIG. 10 is a cross sectional view taken along the plane designated by the line B—B, and also FIG. 11 is a cross sectional view taken along the plane designated by the line C—C. In this arrangement, there is provided a yoke core 12 in an opposite relationship with a thick steel sheet 11 constituting the vehicle's body, both of the steel sheet 11 and yoke core 12 being adapted to form a magnetic circuit together. There is installed a coil 14 in a groove 17 formed between the mentioned two components, and fixedly mounted in position by using bolts 15. An extension of lead wire 16 is extended outside. Thus, there is provided the reactor having such a constructional feature as mentioned above. As fully described in the foregoing exemplary embodiments of the reactor structure according to this invention, by structural combination of the reactor core with a part of the vehicle's structure, there is no necessity to provide any additional installation of the reactor core, thus resulting in substantial savings in view of the space, material, production cost as well as total weight of the vehicle, which will substantially contribute to the materialization of an practical and economical battery-powered vehicle equipped with a large capacity reactor.

As is apparent from the foregoing description, in contrast with the conventional chopper type system in which a constant-torque oriented characteristic is made available due to its voltage control so as to provide for a wide range of speed control, the vehicle speed control device according to this invention is of a power constant oriented characteristic due to its field control, which would inevitably bring a relatively narrow range of speed control. However, in consideration of the general load characteristic of a vehicle, there is required a maximum driving torque at the starting, while the requirement for such driving torque decreases at a high revolution number of a prime mover. Consequently, in general, it is practicably possible to provide a speed control range of 1:6 by applying a field control system, while in the case of a battery-powered fork lift truck, electric locomotive and golf cart, or the like, a maximum speed can be relatively low, and therefore, it is mostly the case that a speed control range of 1:5 is practically safely applicable with a substantial margin in the capacity. However, when it is desired to apply a wider range of speed control, it is practically possible to provide a wider range of speed control by using the series-parallel switching arrangement of a plurality of battery cells, as well as the series-parallel switching of the motor armatures which are divided in plurality, as described hereinbefore.

As fully described hereinbefore, this invention provides an improved vehicle speed control device having such advantageous and characteristics that a high operating efficiency of a battery-powered vehicle may be made available with a relatively simple and less expensive construction, a runnable distance or payload thereof may be extended substantially from a single charge of power, and also a wider range of speed control is made available when necessary.

Although detailed description have been made exclusively on the foregoing typical embodiments of this invention, it should be understood, as indicated hereinbefore, that the preferred embodiments as described and shown herein do not mean in any way limitations of this invention, but on the contrary, many changes, variations and modifications with respect to the construction and arrangement in practice thereof may further be derived by those skilled in the art to which the present invention pertains, whereby the advantageous characteristics of this invention may be realized without departing from the spirit and scope of the invention as set forth hereunto in the appended claims.

What is claimed is:

1. In a self-propelled material handling vehicle, in combination a ferromagnetic balance weight, a compound electric motor for driving said vehicle, said motor comprising a shunt field winding, power source means including a battery on said vehicle for driving said compound motor, and speed control means including reactor means having a core element and a reactor winding coupled in circuit between said power source means and said motor and adapted to prevent a sharp current rise, said core element comprising said ferromagnetic balance weight which forms a complete magnetic circuit for said reactor means, an operator actuatable accelerator device on said vehicle, and means for controlling the shunt field current of said motor in response to actuation of said accelerator device by the operator.

2. The vehicle as claimed in claim 1 wherein said motor further includes a series field winding and wherein said speed control means further includes a first diode and a second diode, wherein at least part of said series winding of said compound motor is short-circuited by said first diode only during a power regenerating operation of said vehicle, and at least part of said reactor is short-circuited by said second diode during a power regenerating operation of said vehicle.

3. The vehicle as claimed in claim 1 wherein said power source means comprises two battery cells which are connectible in series or in parallel with each other, and wherein said speed control means further includes a first diode electrically connecting the positive poles of the cells and being connected to prevent current flow into one of the cells, a second diode electrically connecting the negative poles of the cells and being connected to prevent current flow into the cells, and a switch connecting the positive pole of one cell to the negative pole of the other cell for series operation and being open during a switching operation to prevent series current flowing through the cells.

4. The vehicle as claimed in claim 1 wherein said motor comprises an armature having two sections which are connectible in series or in parallel, and wherein said speed control means further includes a circuit comprising a diode and a first contactor connected in parallel with each other and operatively connected between the plus terminal of one armature section, a second contactor connector between the plus terminal of said one armature section and a third contactor connected between the minus terminal of said other armature section and said power source means, the three contactors being coupled operatively with each other in such a manner that said first contactor between said two armature sections functions in an opposite relationship with the other two contactors so that switching operation of said three contactors selectively connects both armature sections in either series or parallel connection with each other.

5. A vehicle according to claim 1 wherein said last-recited means includes an operator actuated foot pedal and a variable resistor operated by said foot pedal, said variable resistor being connected in circuit with said field winding of said motor.

6. In a self-propelled material handling vehicle, in combination:
    a compound motor including an armature, a series field winding, and a shunt field winding;
    a current-limiting reactor comprising a core element and a reactor winding, said reactor winding being connected in series circuit with said series field winding;
    a variable resistor connected in series circuit with said shunt field winding for regulating motor speed;
    a first diode connected in parallel with at least part of said series field winding to short circuit said series field winding during a power regenerating operation of said motor;
    a second diode connected in parallel with at least part of said reactor winding to short circuit said reactor winding during a power regenerating operation of said motor;
    a battery;
    switch means actuatable for connecting and disconnecting said motor and said battery;
    means for connecting said shunt field winding and said variable resistor to said battery;
    and an acceleration pedal for actuating said switch means and for operating said variable resistor.

7. A vehicle according to claim 6 including a ferromagnetic balancing weight for said vehicle and wherein said weight serves as said core element for said reactor.

8. In a self-propelled material handling vehicle, in combination:

a ferromagnetic balance weight mounted on said vehicle;

a compound electric motor for driving said vehicle, and including an armature, a shunt field winding, and a series field winding;

a battery mounted on said vehicle for driving said motor;

and speed control means for said motor and comprising:

a current-limiting reactor having a reactor core element and a reactor winding, said reactor core element comprising said ferromagnetic balance weight, said reactor winding connected in circuit between said battery and said series field winding to prevent a sharp current rise in said motor;

a variable resistor connected in circuit with said shunt field winding and said battery for regulating shunt field current;

an accelerator pedal actuable by a vehicle operator for operating said variable resistor whereby the resistance value of said variable resistor changes in proportion to actuation of said pedal;

on-off switch means connected in circuit between said battery and said motor and actuatable by said pedal;

a first diode connected to short-circuit at least part of said series field winding during a power regeneration braking operation;

a second diode connected to short-circuit at least part of said reactor winding during a power regeneration braking operation for preventing an irregular surge in the circuit;

and a discharge resistor connected in parallel with said shunt field winding.

9. A vehicle according to claim 8 including forward and reverse contactor means for selectively connecting said armature to said battery for forward and reverse motor operation.

10. A vehicle according to claim 9 including a fixed resistance connected in series circuit between said battery and said variable resistor.

* * * * *